United States Patent
Nariyasu

(10) Patent No.: US 6,168,196 B1
(45) Date of Patent: Jan. 2, 2001

(54) TONGUE FOR AN INFLATABLE BELT AND INFLATABLE BELT DEVICE

(75) Inventor: Tutomu Nariyasu, Echigawa (JP)

(73) Assignee: Takata Corporation, Tokyo (JP)

(*) Notice: Under 35 U.S.C. 154(b), the term of this patent shall be extended for 0 days.

(21) Appl. No.: 09/321,103

(22) Filed: May 27, 1999

(30) Foreign Application Priority Data

May 27, 1998 (JP) ................................. 10-145826

(51) Int. Cl.[7] .................................................. B60R 21/18
(52) U.S. Cl. ............................................................ 280/733
(58) Field of Search ............................................ 280/733

(56) References Cited

U.S. PATENT DOCUMENTS

| 5,385,367 | * | 1/1995 | Tanaka et al. | 280/733 |
| 5,465,999 | * | 11/1995 | Tanaka et al. | 280/733 |
| 5,466,033 | * | 11/1995 | Tanaka et al. | 280/733 |

* cited by examiner

Primary Examiner—Kenneth R. Rice
(74) Attorney, Agent, or Firm—Foley & Lardner

(57) ABSTRACT

An inflatable belt device includes a tongue having a rear end connected to an inflatable belt; a buckle with which the tongue is to be engaged; and a gas generator or inflator for supplying gas into the buckle. The tongue includes a tongue base having a gas passage or duct; a tongue plate fixed to the tongue base; and a lap belt anchor. The lap belt anchor has an L-like configuration and includes a base and a bracket, which extends perpendicularly from the base and has an opening formed therein. The base is attached pivotally to the tongue plate by a pivot pin. A sheet, made from a low friction material, may be placed between the plate and the base, thus facilitating the pivoting of the tongue. As a result of this arrangement, gas is introduced much more smoothly from a tongue of an inflatable belt device into the inflatable belt. A low pressure gas generator may thus be used.

11 Claims, 6 Drawing Sheets

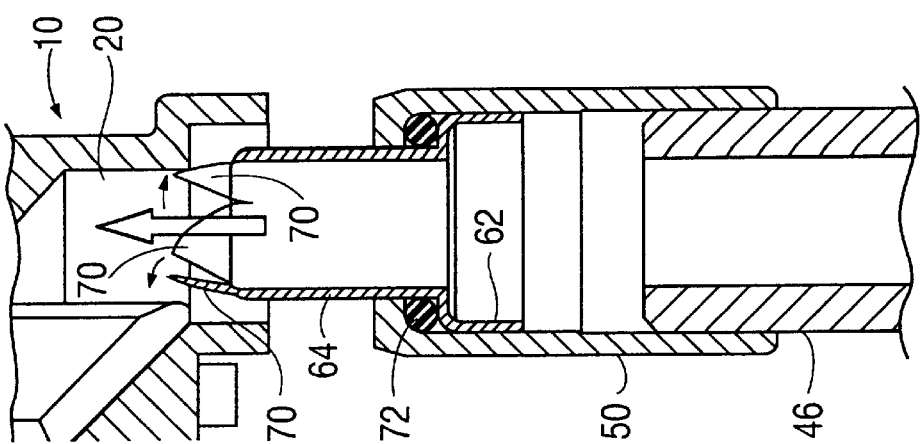
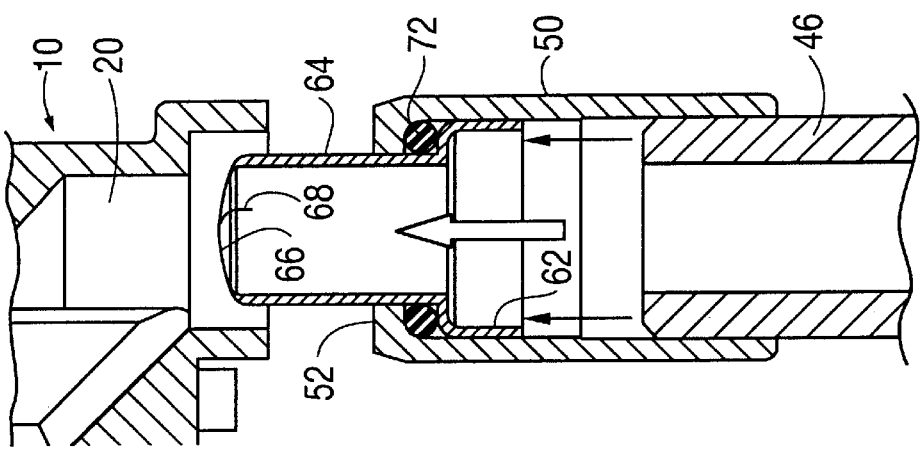
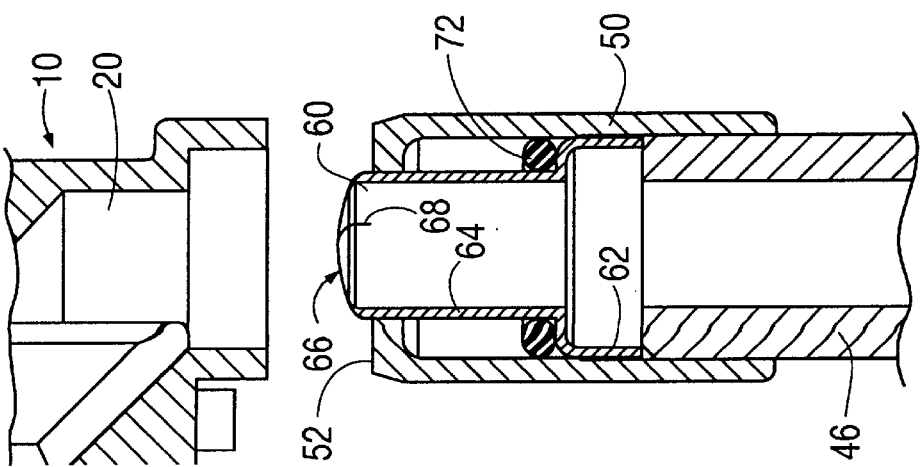

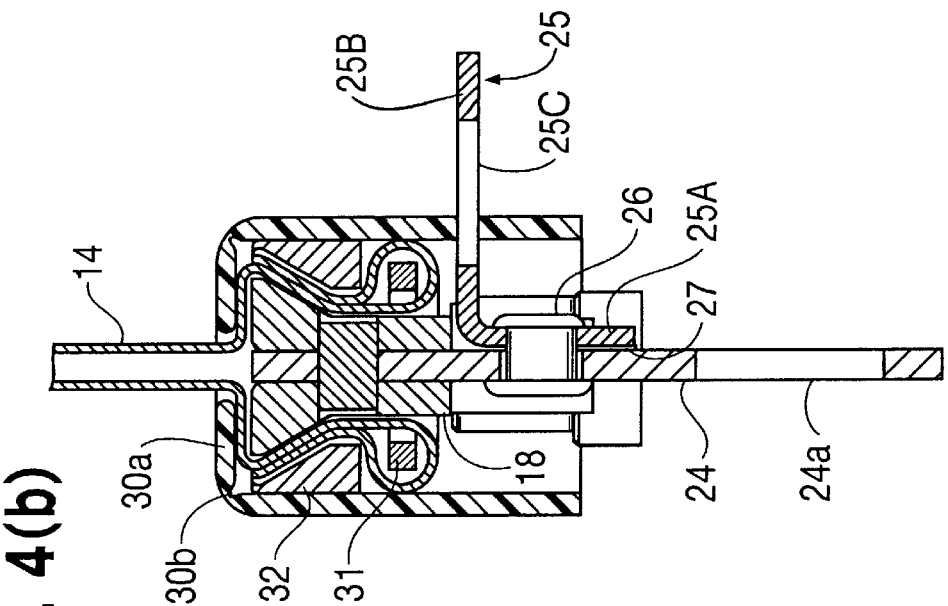
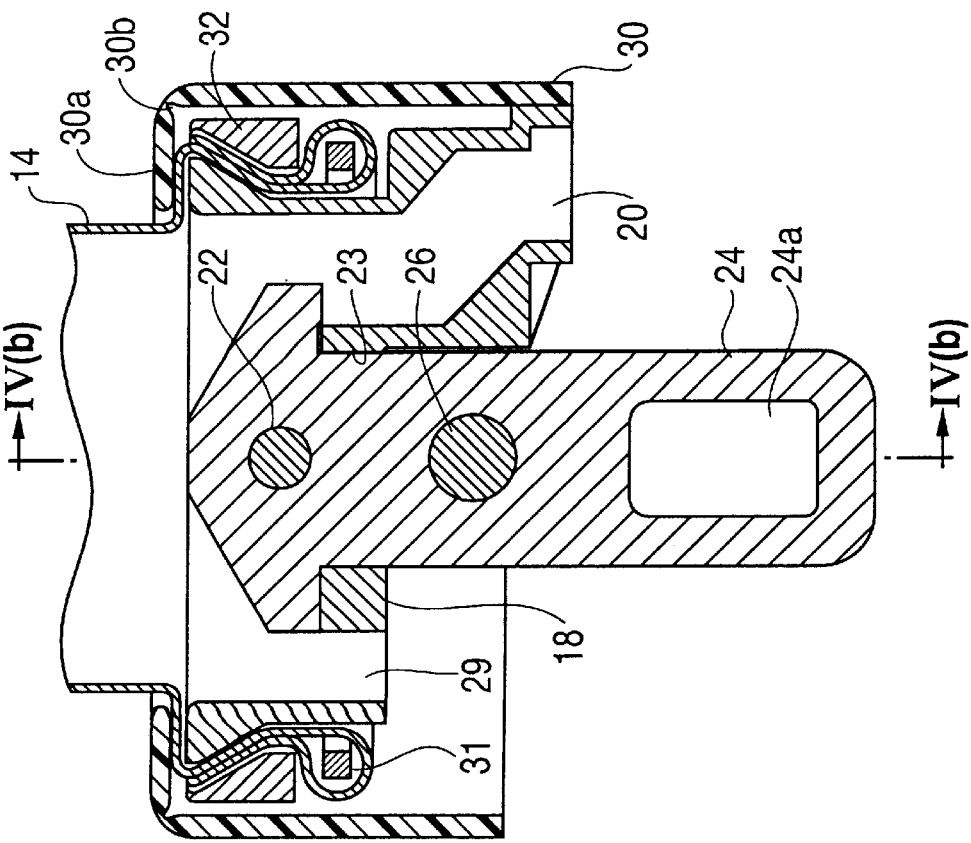
FIG. 4(a)
FIG. 4(b)

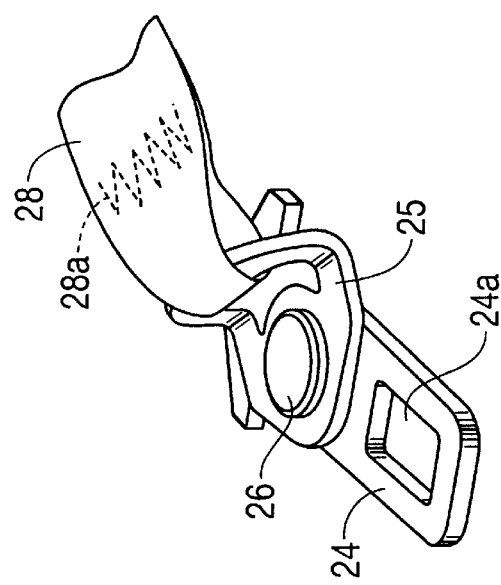
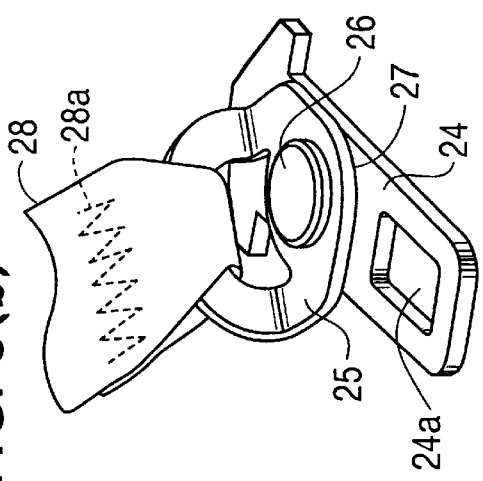
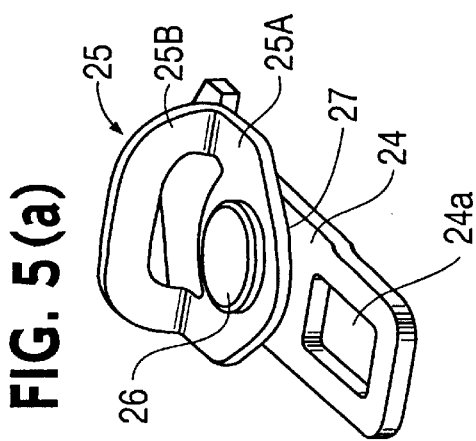

TONGUE FOR AN INFLATABLE BELT AND INFLATABLE BELT DEVICE

BACKGROUND OF THE INVENTION

1. Field of the Invention

The present invention relates to an inflatable belt device for protecting an occupant in an automobile during a collision, and a tongue used in the device. More particularly, the invention relates to an inflatable belt device, and the tongue used in that device, in which gas is supplied from a buckle into the inflatable belt via a tongue.

2. Description of the Related Art

An inflatable belt device is disclosed, for example, in Japanese Unexamined Patent Publication H5-85301, which is shown in FIG. 6(a). This inflatable belt device 1 includes a shoulder belt 2 extending diagonally from the right side to the left side of an occupant; a lap belt 3 extending from the right side to the left side of the occupant; a buckle 4 fixed to, for example, a vehicle floor; a tongue 5 for inserting into and engaging the buckle 4 during seat belt usage; and an intermediate guide 6 for guiding the shoulder belt 2.

The shoulder belt 2 includes a webbing 2a, which is the same as a typical conventional seat belt, and an inflatable belt 2b connected to an end of the webbing 2a. The other end of the inflatable belt is connected to a tongue 5. The webbing 2a is slidably hung by the intermediate guide 6. The other end of the webbing 2a is connected to a seat belt retractor 7 with an emergency locking mechanism (ELR) and is fixed to the vehicle body. The webbing 2a is arranged such that it is wound and unwound by the seat belt retractor 7. The inflatable belt 2b is positioned such that it contacts the occupant.

The lap belt 3 includes a webbing, which is the same as a typical conventional seat belt, of which, one end is connected to a lap belt anchor 5a of the tongue 5 and the other end is connected to the seat belt retractor (ELR) 8, which is fixed to the vehicle body. A gas generator 9 is connected to the buckle 4, which is mounted to a vehicle body member by inserting a bolt through a bolt hole 4a provided at the base of the buckle 4. The gas generator 9 acts during emergency situations, such as a vehicle collision, and generates high pressure gas. The tongue 5 and the buckle 4 are provided with passages so that gas flows from the gas generator 9 to the inflatable belt 2b.

As shown in FIG. 6(b), the inflatable belt 2b of the shoulder belt 2 includes a belt body 2c, which is folded into an envelope-like shape, and a cover 2d. The belt body 2c is folded and covered by the cover 2d. Both ends of the cover 2d are then connected by stitching 2e so that the inflatable belt 2b is normally kept in a band-like configuration. The stitching 2e of the cover 2d is easily torn by a force resulting from shoulder belt expansion caused by the gas generator 9 being actuated. The inflatable belt is thus deployed as shown by a two-dot chain line.

With this known inflatable seat belt device, when the vehicle collides while the device is being used (i.e., the tongue 5 is engaged with the buckle 4), a tensile force is transmitted from the lap belt 3 to the tongue 5, which causes the buckle 4 to pivot toward the front of the vehicle about hole 4a, which acts as the pivoting center. If the angle of the pivoting is too great, then the connection between the tongue 5 and the inflatable belt 2b will be inflected or bent, thus choking the gas flow from the tongue 5 into the inflatable belt 2b (similar to what occurs when a water hose is bent or inflected). In order to overcome this choking effect, a gas generator 9 with a high gas pressure is required.

The difficulties suggested in the preceding are not intended to be exhaustive but rather are among many tending to reduce the effectiveness of known inflatable seat belt devices. Other noteworthy problems may exist; however, those presented above should be sufficient to demonstrate that such methods and apparatuses appearing in the past will admit to worthwhile improvement.

SUMMARY OF THE INVENTION

Accordingly, it is a general object of the invention to provide a tongue for an inflatable belt device and an inflatable belt device which will obviate or minimize difficulties of the type previously described.

It is a specific object of the invention to provide a tongue and an inflatable belt device in which gas flows extremely smoothly from the tongue into the inflatable belt.

It is another object of the invention to provide a tongue and an inflatable belt device in which a gas generator generates only a relatively low gas pressure.

It is still another object of the invention to provide a tongue and an inflatable belt device in which the bending or inflecting of the connection between the tongue and the inflatable belt device is greatly reduced or eliminated.

A preferred embodiment of the inventive tongue, which is intended to accomplish at least some of the foregoing objects, includes a tongue body having a rear end connected to the inflatable belt and having a front end adapted for engaging a buckle; a passage fluidly connecting the front portion with the rear portion of the tongue body and for introducing a fluid into the inflatable belt; and a lap belt anchor pivotally attached to the tongue body.

Additional objects and advantages of the invention will be set forth in the following description, and, in part, will be obvious from the description, or may be learned by practicing the invention. The objects and advantages of the invention may be realized and obtained by the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the above general description and the following detailed description of preferred embodiments, serve to explain the principles of the invention.

FIGS. 3(a)–(c) are sectional views showing the buckle and the tongue of FIG. 1 in the connected state.

FIG. 4(a) is a sectional view of the tongue and FIG. 4(b) is a sectional view taken along the line IVb—IVb in FIG. 4(a).

FIGS. 5(a)–5(c) are perspective views of a tongue plate provided with a lap belt anchor.

DETAILED DESCRIPTION OF PREFERRED EMBODIMENTS

A tongue for an inflatable belt of the present invention includes a tongue body having a rear end portion connected to an inflatable belt and having a front portion adapted to be engaged with a buckle, a gas passage fluidly connecting the front portion with the rear portion of the tongue body to introduce gas into the inflatable belt, and a lap belt anchor pivotally attached to the tongue body.

An inflatable belt device of the present invention uses the tongue described above. In such an arrangement of the tongue and the inflatable belt device, the pivotal movement of the buckle, which is caused by tensile force being transmitted from the lap belt via the lap belt anchor during a vehicle collision, substantially decreases, because the lap belt anchor is attached pivotally to the tongue and the tongue pivots in the direction of the tensile force. Accordingly, the flexion of the inflatable belt at the connection between the tongue and the inflatable belt is minimized. A smooth gas flow from the tongue into the inflatable belt thus results. As a result, a low pressure gas generator can be employed.

In the present invention, the lap belt anchor is preferably attached pivotally to a tongue plate of the tongue. In such an arrangement, the tensile force transmitted from the lap belt anchor rarely results in rotational torque to the tongue.

It is also preferable that the lap belt anchor include a base pivotally attached to, and extending along, the tongue plate; a bracket extending perpendicularly from the base; and an opening formed in the bracket for inserting a lap belt.

In an inflatable belt device using the tongue described above, the tongue plate, which is directed vertically downward when the tongue is disengaged from the buckle, the lap belt, and the inflatable belt are hung along the center pillar.

Figure 1A:
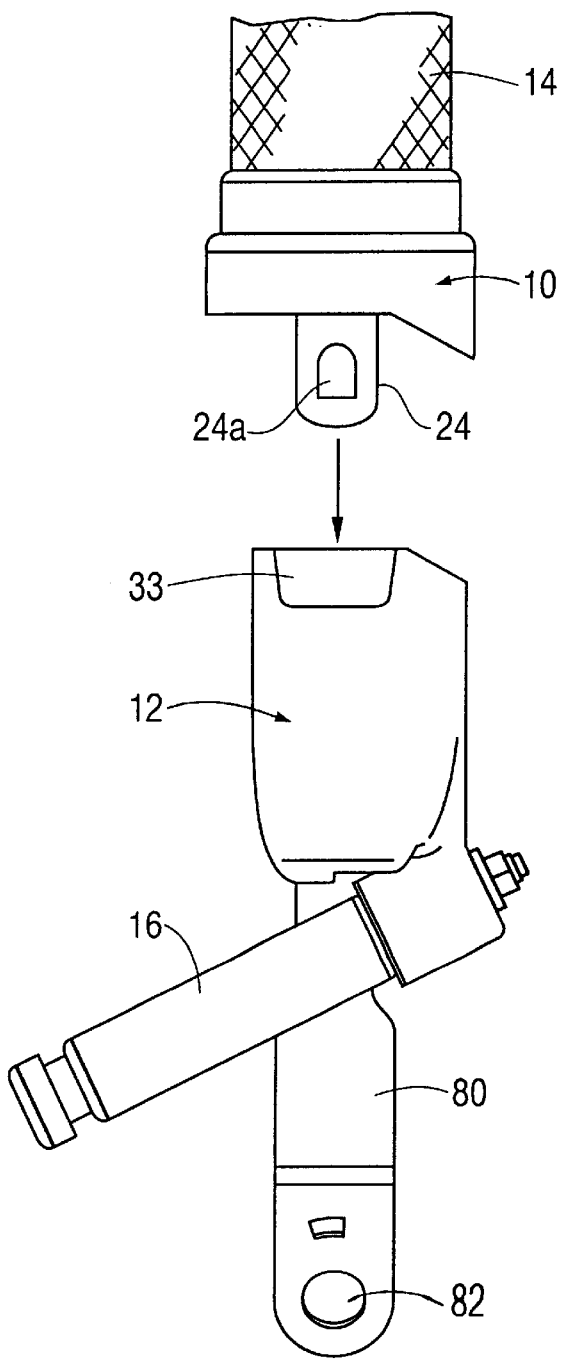
FIG. 1(a) is a front view of a tongue and a buckle of an inflatable belt device according to an embodiment of the present invention and FIG. 1(b) is a perspective view of the buckle.
Figure 1B:
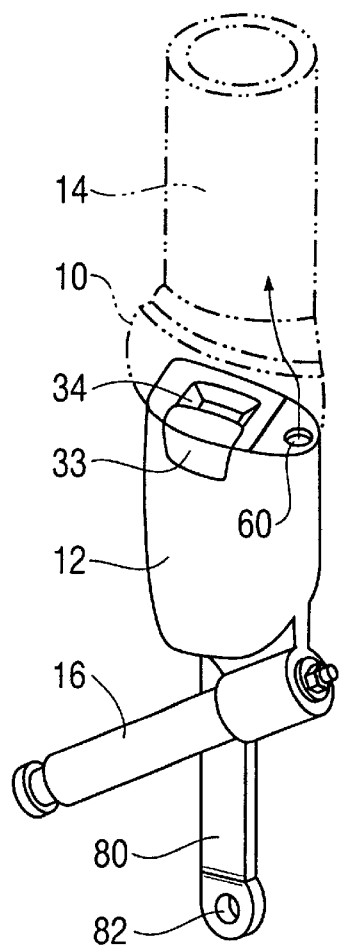

Referring now to the drawings, wherein the same numeral indicates the same or similar parts, and initially to FIG. 1(*a*), there will be seen a preferred embodiment of the inflatable belt device according to the invention. This inflatable belt device is installed, as part of a safety belt restraint system, in a vehicle for protecting the occupant.

The inflatable belt device includes a tongue 10 connected at a rear portion to an inflatable belt 14; a buckle 12 which is to be engaged with the tongue 10; and a gas generator or inflator 16 for supplying gas into the buckle 12.

The inflatable belt 14 constitutes a portion of a shoulder belt of a safety belt restraint system. A rear end of the inflatable belt 14 is connected to the front end of a webbing, which is part of the shoulder belt. The rear end of the webbing is arranged such that it is wound and unwound in a seat belt retractor for the shoulder belt.

The buckle 12 includes a bracket 80 extending downward from the bottom of the buckle 12. The buckle 12 is preferably fixed to a vehicle body member by passing a bolt through a bolt hole 82 formed in the bracket 80.

As shown in FIG. 1(*b*), the tongue plate 24 is inserted into a tongue plate insertion slot 34 of the buckle 12. A latch hole 24*a* of the tongue plate 24 engages a latch of a latching mechanism 35 in the buckle 12, thereby latching the tongue 10 to the buckle 12. The latch is released by pressing a press button 33 provided in the buckle 12, thus causing the tongue plate 24 to be pushed out of the buckle 12 by a spring.

A cylinder-shaped piston 60 is disposed near the tongue plate insertion slot 34 in the front end surface of the buckle 12, such that piston 60 is able to protrude from the buckle 12. The inside of the cylinder 60 communicates with the gas generator 16.

As shown in FIGS. 4(*a*) and 4(*b*), the tongue 10 preferably includes a tongue base 18 having a gas passage or duct 20; a tongue plate 24 fixed to the tongue base 18; and a lap belt anchor 25. The inside of the duct 20 communicates with the inside of the inflatable belt 14.

As shown in FIG. 4(*a*), the tongue base 18 is provided with a slot 23 for inserting the tongue plate 24. The tongue plate 24 is inserted into the slot 23 and is fixed to the tongue base 18 by a pin 22, which penetrates pin holes in the tongue plate 24 and the tongue base 18, respectively.

As shown in FIGS. 4(*b*) and 5(*a*), the lap belt anchor 25 has an L-like configuration and includes a base 25A and a bracket 25B, which extends perpendicularly from the base 25A and has an opening 25C formed therein. The base 25A is attached pivotally to the tongue plate 24 by a pivot pin 26. A sheet 27, made from a low friction material, such as fluorocarbon resin, is inserted between the base 25A and the tongue plate 24.

As shown in both FIGS. 4(*a*) and 4(*b*), the tongue base 18 preferably has an oval cylindrical shape, of which a rear portion is inserted into the inflatable belt 14. The front end of the inflatable belt 14 preferably is folded back at a hook ring 31 and is held between a wedge ring 32 and the tongue base 18. The outer periphery of the tongue base 18 and the rings 31, 32 are preferably covered by a plastic tongue cover 30. A flange 30*a* extends inward from the rear portion of the tongue cover 30. A groove 30*b* preferably is formed in the base portion of the flange 30*a*.

As will be described later, when gas is supplied from the gas generator 16 through duct 20 into the inflatable belt 14, thus inflating the inflatable belt 14, the flange 30*a* preferably tears open to form a plurality of flaps. The flaps preferably turn along the groove 30*b* and open outward like a door.

The tongue base 18 preferably is provided with a vent hole 29 to relieve gas from inside the inflatable belt 14. When an occupant leans against the inflated inflatable belt 14, the impact to the occupant is absorbed by allowing gas to leak from the inflatable belt 14 through the vent hole 29.

A tongue sensing switch 37, which senses when the tongue plate 24 is inserted deeply into the buckle 12 and the latching being complete, preferably is provided.

Figure 6A:
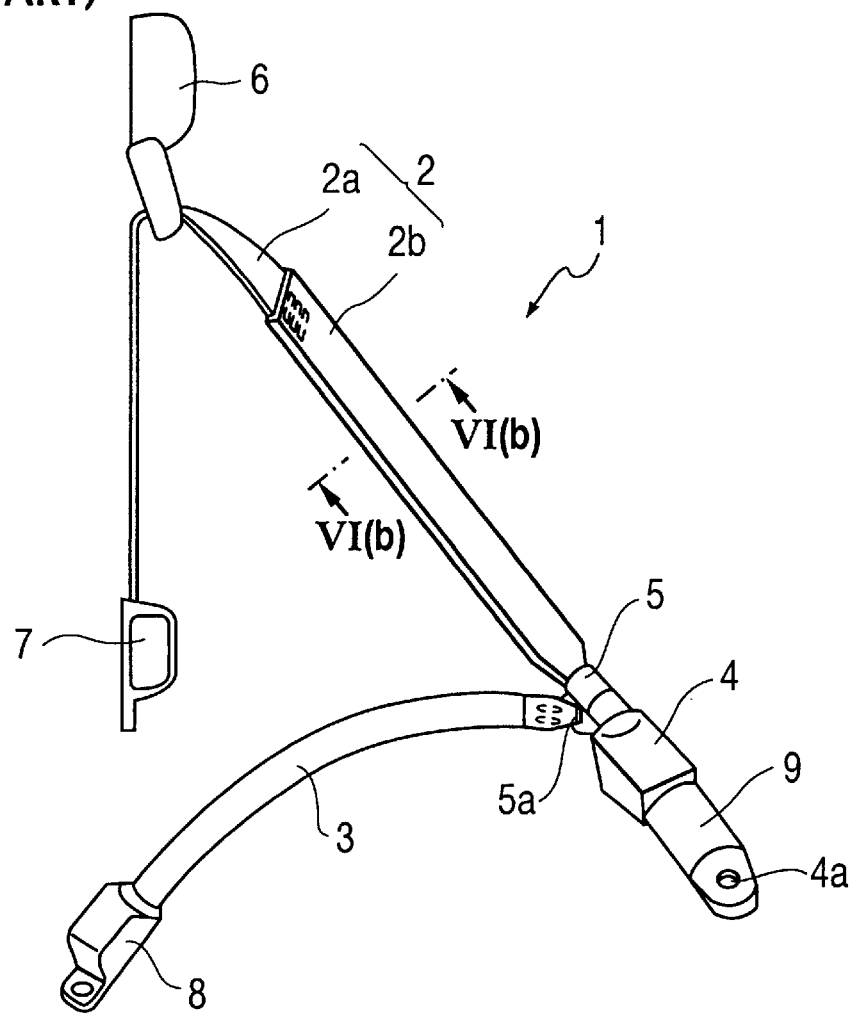
FIG. 6(a) is a general perspective view of a known inflatable belt device and FIG. 6(b) is a sectional view taken along the line VIB–VIB in FIG. 6(a).
Figure 6B:
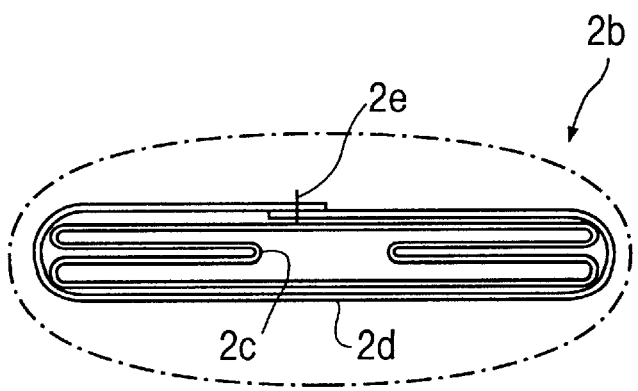

As shown in FIGS. 5(*b*) and 5(*c*), a lap belt 28 is inserted into and connected to the opening 25C formed in the bracket 25B of the lap belt anchor 25. An end of the lap belt 28 is sewn to a subsequent portion of the belt after being passed through the opening 25C. Stitches of this sewing are designated by numeral 28*a*. The rear end of the lap belt 28 is arranged such that it is wound and unwound by a seat belt retractor for lap belt, similar to that in FIG. 6 described above.

Figure 2:
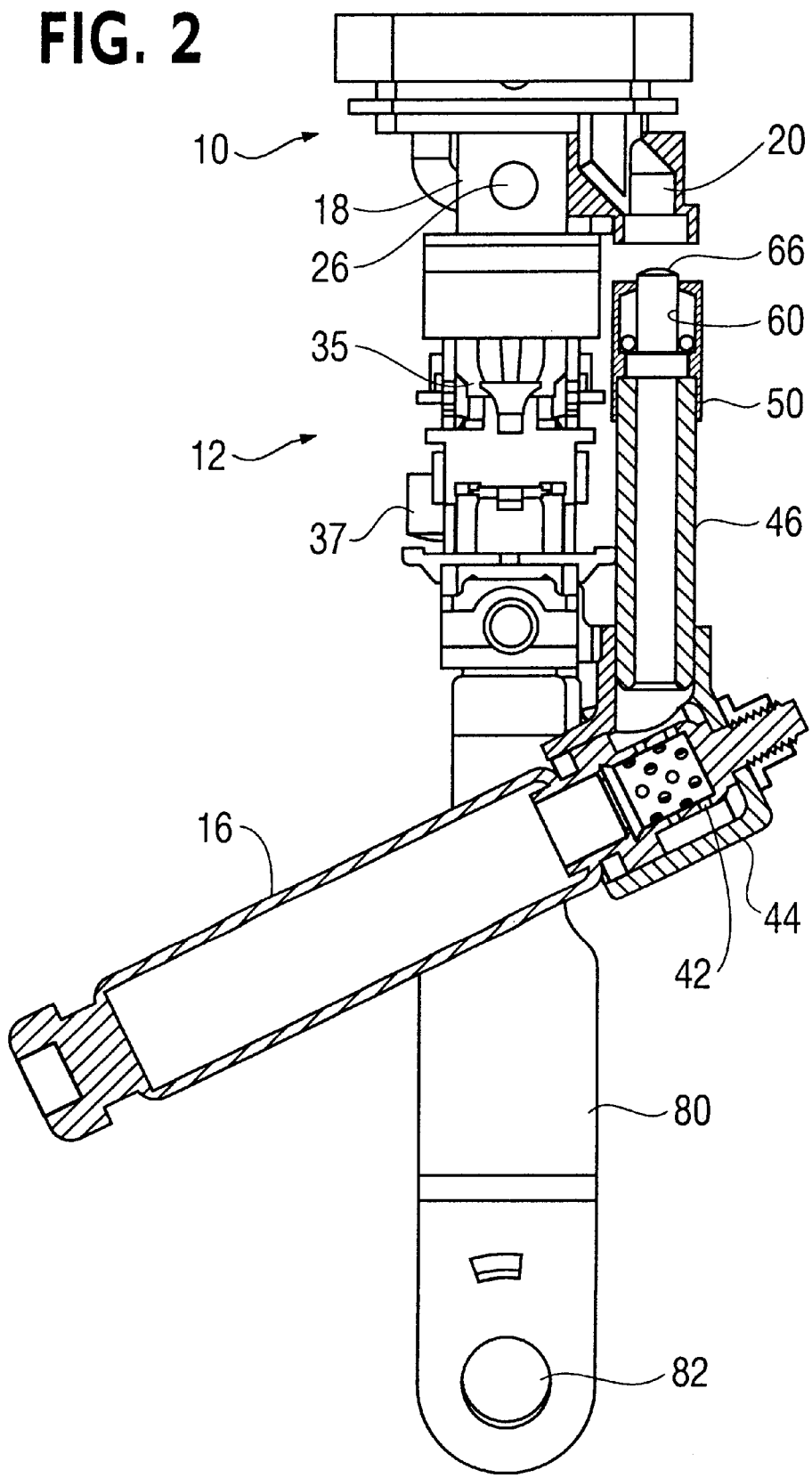
FIG. 2 is a structural view showing the internal construction of the buckle and the tongue of FIG. 1.

As shown in FIG. 2, a gas passage or duct 46, which includes a pipe, is connected, via attachment 44, to a gas nozzle 42, which is located at the end of the inflator 16. The duct 46 preferably is fixed to a base portion of a piston holder 50. The piston holder 50 preferably has a substantially cylindrical shape and has a flange 52 extending inward from one end of the piston holder 50.

The piston 60 preferably has a substantially cylindrical shape and preferably includes a large diameter portion 62 at its rear and a small diameter portion 64 at its front. The small diameter portion 64 penetrates the flange 52 of the piston holder 50. The large diameter portion 62 is sized such that it cannot pass through the flange 52. The end surface of the piston 60 is closed with a cap 66.

As shown in FIGS. 3(*a*)–(*c*), an O-ring 72 is fitted to the small diameter portion 64 of the piston 60. The O-ring 72 serves as a seal ring. This O-ring 72 preferably is located at the step portion between the small diameter portion 64 and the large diameter portion 62.

As shown in FIG. 3(*a*), when the tongue 10 is engaged with the buckle 12, the end of the piston 60 confronts the inlet of the duct 20 of the tongue 10. As seen in FIG. 3(b), when the inflator 16 is actuated and gas pressure pushes the piston 60 forward to its limit, the end of the piston 60 enters the duct 20 of tongue 10. As shown in FIG. 3(c), when the cap 66 tears open, with the piston 60 inserted in duct 20, the front end portions of formed flaps 70 enter in the duct 20.

As shown in FIGS. 3(a) and 3(b), the cap 66 has tear lines 68, which are preferably made from shallow grooves. The tear lines 68 facilitate the cap 66 tearing open when a gas pressure is applied from the inflator 16. As shown in FIG. 3(c), a plurality of flaps 70 is formed from the torn cap 66.

The manner of operation of the tongue and the inflatable device will now be explained. When the device is not being used, that is, the tongue 10 is disengaged from the buckle 12, the shoulder belt is wound into the retractor for the shoulder belt, and the lap belt 28 is wound into the retractor for the lap belt. The inflatable belt 14 and the lap belt 28 thus extend vertically along a center pillar of the vehicle. In this state, the tongue plate 24 is directed vertically downward and the bracket 25B of the lap belt anchor 25 is directed horizontally. Such a direction of the tongue plate 24 decreases the interference of the tongue plate 24 with the occupant or a mechanic of the vehicle.

When the device is being used, that is, the tongue is inserted in buckle 12, and the vehicle collides, the inflator 16 is actuated and gas is supplied to piston 60 through duct 46, thus pushing the piston 60 forward. The piston 60 advances until the large diameter portion 62, through O-ring 72, impacts the flange 52. Then cap 66 tears open and gas flows through duct 20 into the inflatable belt 14, thus inflating inflatable belt 14.

When the occupant leans against the inflated inflatable belt 14, gas is relieved gradually through vent hole 29, thus decreasing the impact to the occupant and increasing protection afforded to the occupant.

During the vehicle collision, the body of the occupant moves forward and the lap belt 28 pulls the tongue 10 strongly via lap belt anchor 25 in the direction of the vehicle's front. At this time, the lap belt anchor 25 pivots about the pin 26 relative to the tongue plate 24. Because the lap belt anchor 25 is attached to the tongue plate 24 pivotally with sheet 27 therebetween, a smooth pivoting results because the sheet 27, which is constructed from a low friction material, facilitates pivoting. As a result, the pivoting angle of the buckle 12 around the bolt hole 82 is substantially decreased, minimizing the flexion of the inflatable belt 14 at the connection between the tongue 10 and the inflatable belt 14. Gas is thus allowed to flow extremely smoothly through the duct 20 of the tongue 10 into the inflatable belt 14. A low pressure gas generator 16 may thus be used.

In this embodiment, tips of the flaps 70 enter into the duct 20, such that the flaps 70 close the gap between the duct 20 and the outlet of the piston 60. Gas can thus be supplied from the piston 60 into the inflatable belt 14 entirely, or almost entirely, without leaking to the outside.

In this embodiment, the O-ring 72, which is fitted on the piston 60, is in elastic contact with the outer surface of the piston 60 and the inner periphery surface of the piston holder 50. Gas is thus prevented from leaking. Also, contact noise from the piston 60 and the piston holder 50, which is caused by the buckle 12 vibrating, is also prevented.

In addition, when piston 60 advances to the limit and its large diameter portion 62 hits the flange 52, the O-ring 72 intervenes between the large diameter portion 62 and the flange 52, thereby substantially suppressing contact noise from the large diameter portion 62 and the flange 52.

In the buckle 12 according to the embodiment, when the tongue 10 is not engaged, the cap 66 closes the outlet of the piston 60, thereby preventing foreign matters from entering piston 60 and duct 46. This prevents foreign matters from accompanying gas into the inflatable belt 14 when the inflatable belt device is actuated.

As described above, according to the present invention, as gas is supplied from the buckle side to the tongue, the gas flows smoothly into the inflatable belt, thereby enabling a gas generator with low pressure to be employed. In addition, the L-shaped lap belt anchor enables an arrangement in which the tongue plate is directed vertically downward when the inflatable belt and the lap belt are hung along the vehicle center pillar.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

Priority document Japanese Patent Application, 10-145826, filed May 27, 1998, as well as Japanese Patent Application H10-143010, filed May 25, 1998, are hereby incorporated by reference.

What is claimed is:

1. A tongue for an inflatable belt comprising:
    a tongue body having a rear end connected to the inflatable belt and having a front end adapted for engaging a buckle;
    a passage, fluidly connecting the front portion with the rear portion and for introducing a fluid into the inflatable belt; and
    a lap belt anchor pivotally attached to the tongue body.

2. A tongue for an inflatable belt as claimed in claim 1, wherein the tongue body includes a tongue plate and the lap belt anchor is attached pivotally to the tongue plate.

3. A tongue for an inflatable belt as claimed in claim 1, wherein the lap belt anchor includes:
    a base extending along the tongue plate and pivotally attached to the tongue body;
    a bracket extending substantially perpendicularly from the base; and
    an opening in the bracket for inserting a lap belt.

4. A tongue for an inflatable belt as claimed in claim 2, wherein the lap belt anchor includes:
    a base extending along the tongue plate and pivotally attached to the tongue plate;
    a bracket extending substantially perpendicularly from the base; and
    an opening in the bracket for inserting a lap belt.

5. A tongue for an inflatable belt as claimed in claim 1, further comprising a sheet of low friction material between the lap belt anchor and the tongue body.

6. A tongue for an inflatable belt as claimed in claim 2, further comprising a sheet of low friction material between the lap belt anchor and the tongue plate.

7. A tongue for an inflatable belt as claimed in claim 3, further comprising a sheet of low friction material between the base of the lap belt anchor and the tongue plate.

8. An inflatable belt device for an automotive vehicle, comprising:
    an inflatable belt;
    a buckle mounted to the vehicle and having a fluid passage;

a tongue having:
   a tongue body having a rear end connected to the inflatable belt and having a front end adapted for engaging a buckle;
   a passage fluidly connecting the front portion with the rear portion of the tongue body and for introducing a fluid into the inflatable belt; and
   a lap belt anchor pivotally attached to the tongue body
   a lap belt connected to the lap belt anchor; and
an inflator fluidly communicating with the fluid passage of the buckle.

9. A tongue for an inflatable belt as claimed in claim 8, wherein the tongue body includes a tongue plate and the lap belt anchor is attached pivotally to the tongue plate.

10. A tongue for an inflatable belt as claimed in claim 9, wherein the lap belt anchor includes:
   a base extending along the tongue plate and pivotally attached to the tongue plate;
   a bracket extending substantially perpendicularly from the base; and
   an opening in the bracket for inserting a lap belt.

11. A tongue for an inflatable belt as claimed in claim 10, further comprising a sheet of low friction material between the base of the lap belt anchor and the tongue plate.

* * * * *